March 17, 1964
C. E. SHEETZ
3,125,210
ROTARY FRUIT HANDLING APPARATUS
Filed Nov. 23, 1959
8 Sheets-Sheet 3
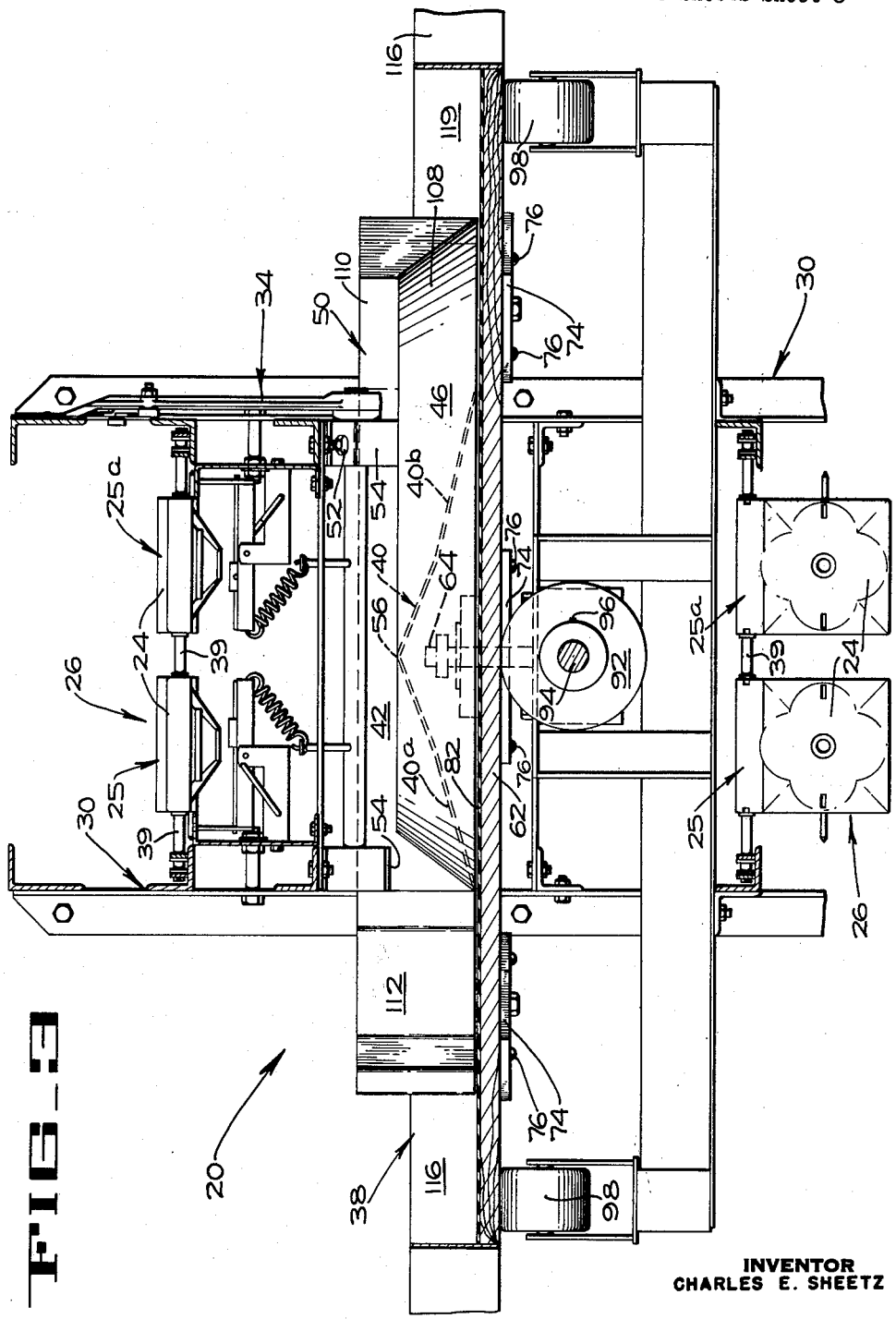
FIG_3
INVENTOR
CHARLES E. SHEETZ
BY Hans G. Hoffmeister
ATTORNEY

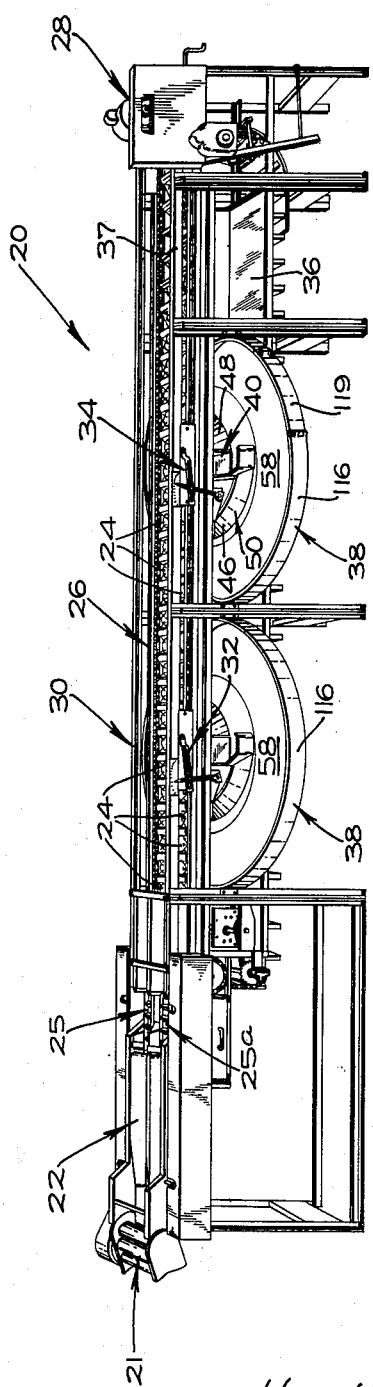

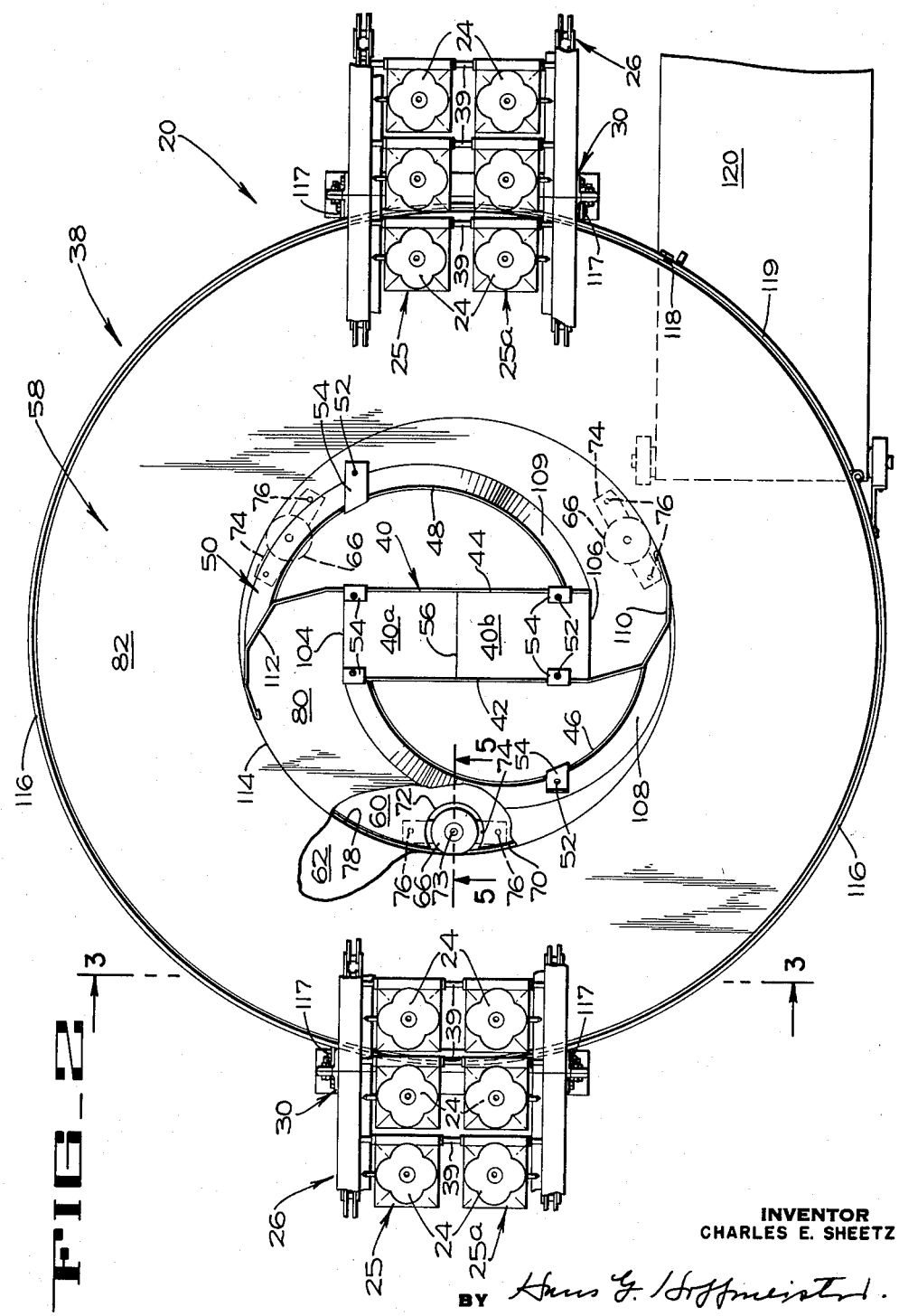

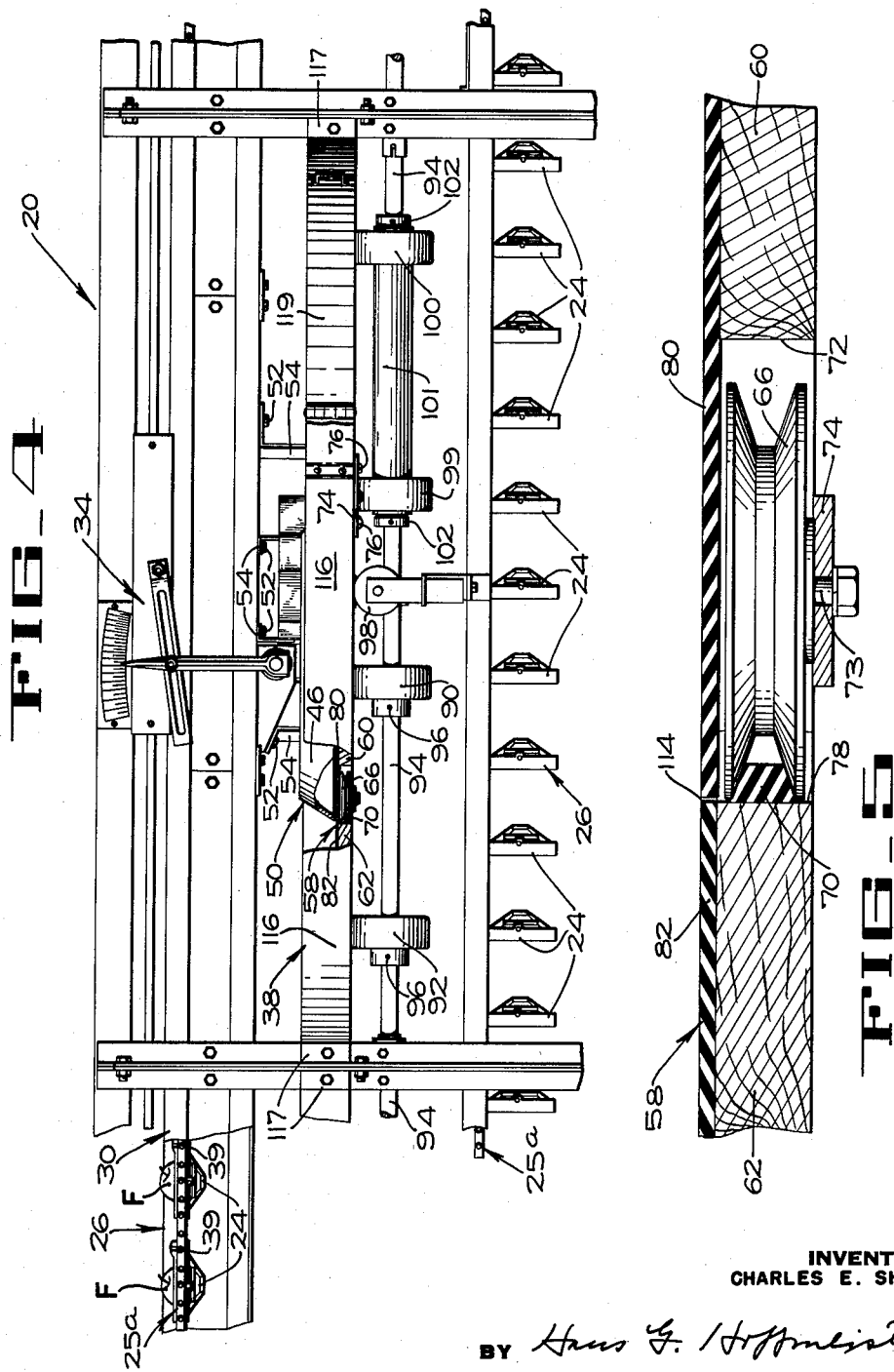
INVENTOR
CHARLES E. SHEETZ
BY Hans G. Hoffmeister
ATTORNEY

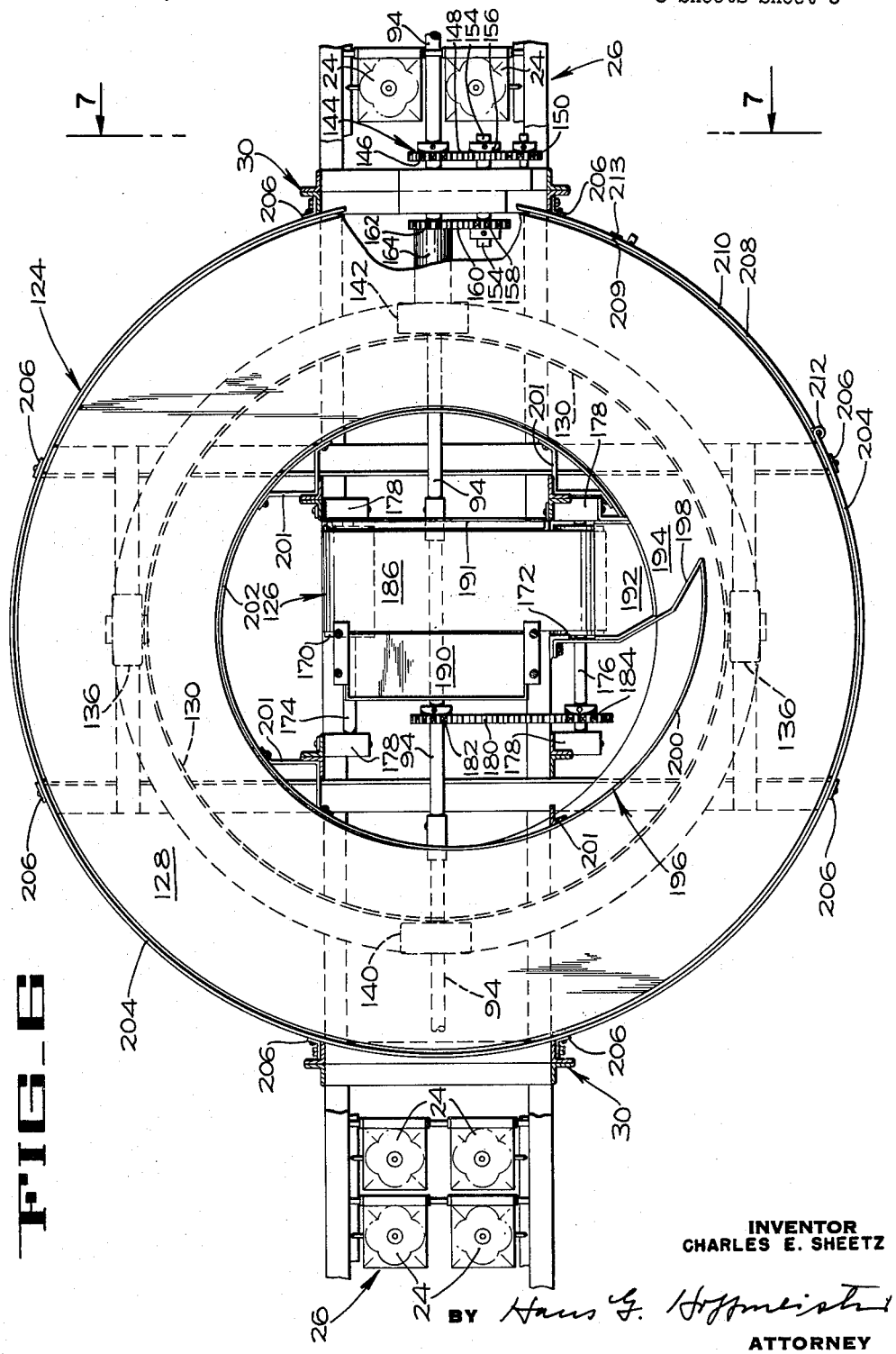

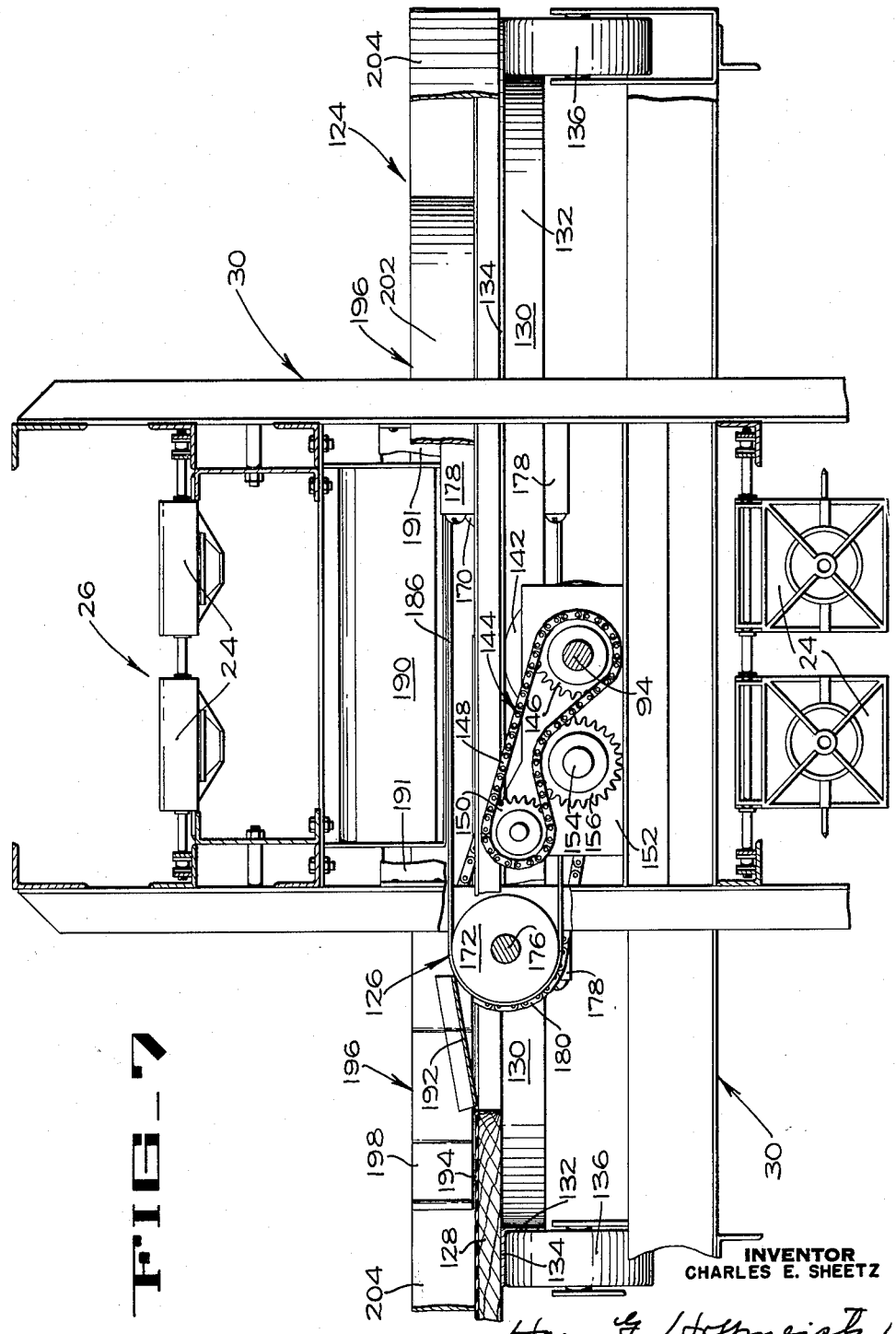

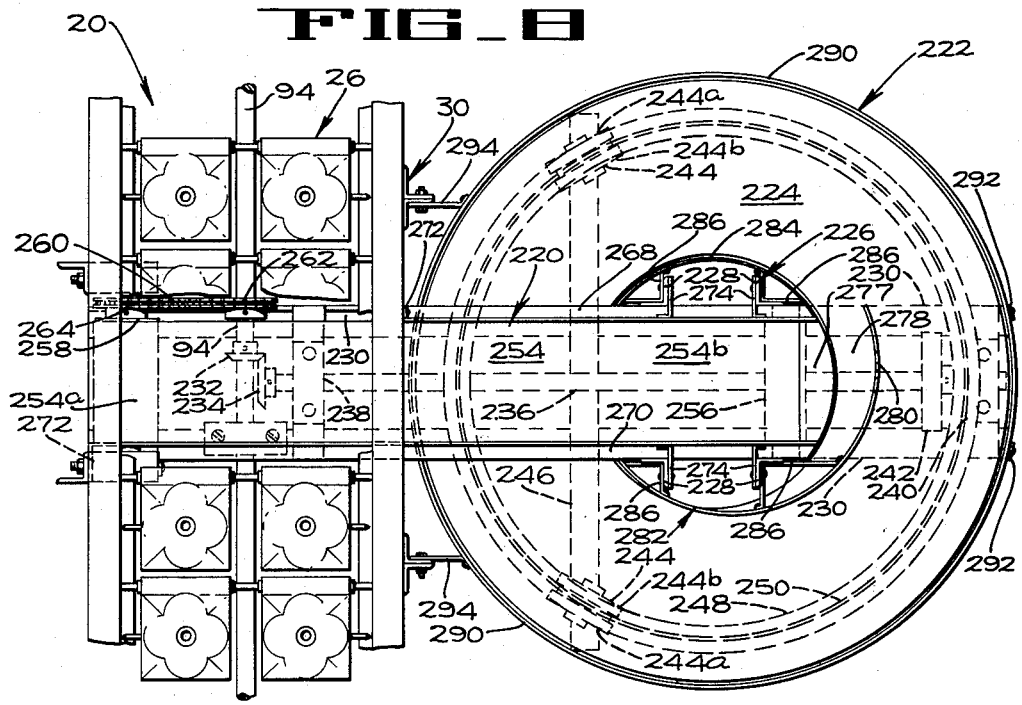
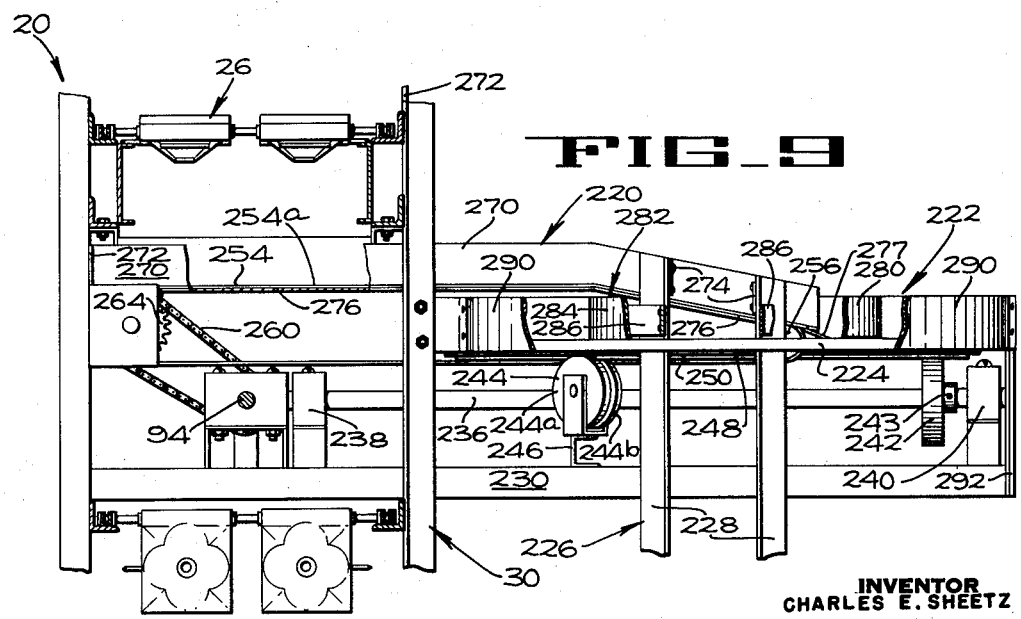

March 17, 1964
C. E. SHEETZ
3,125,210
ROTARY FRUIT HANDLING APPARATUS
Filed Nov. 23, 1959
8 Sheets-Sheet 8
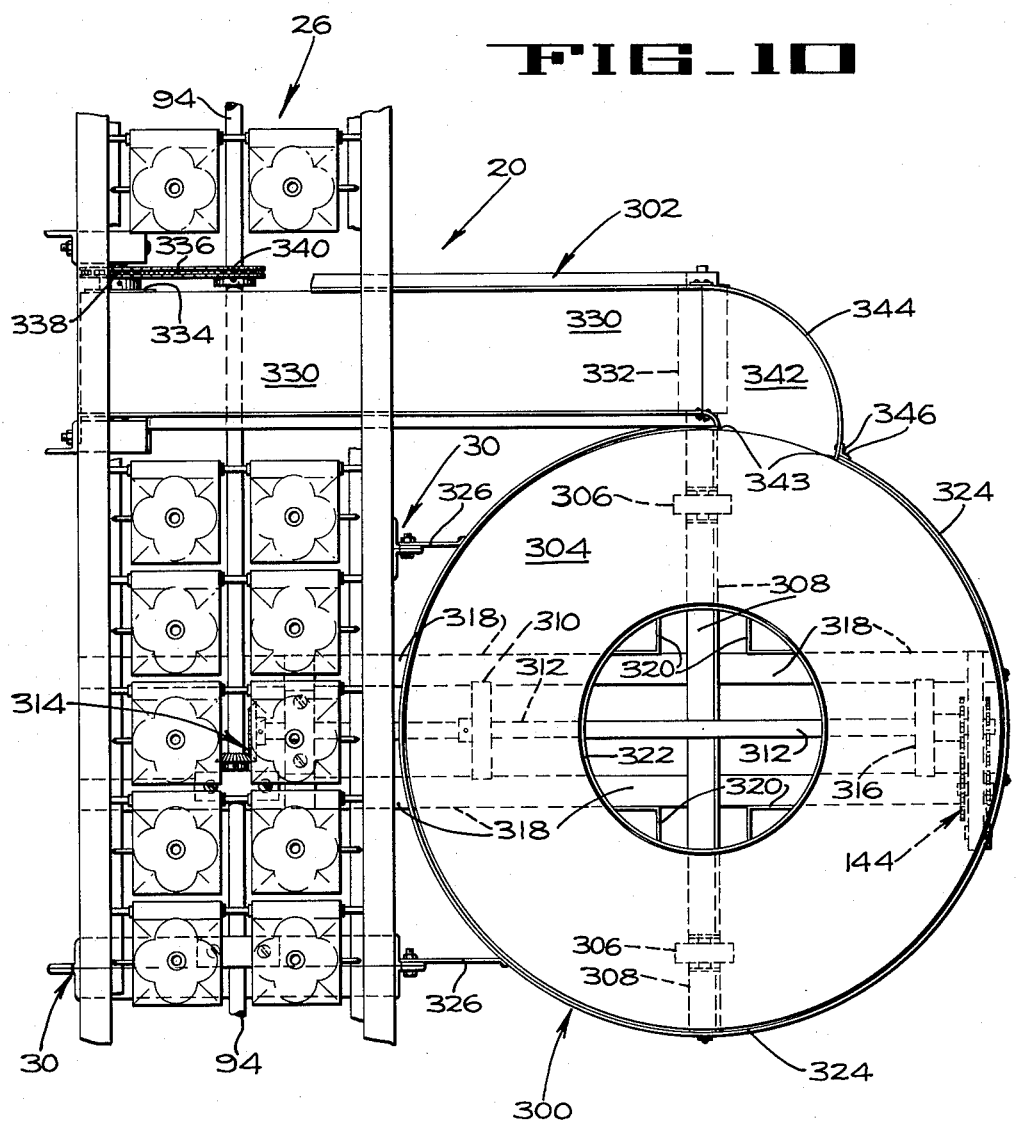
FIG_10
INVENTOR
CHARLES E. SHEETZ
BY Hans G. Hoffmeister
ATTORNEY

United States Patent Office 3,125,210
Patented Mar. 17, 1964

3,125,210
ROTARY FRUIT HANDLING APPARATUS
Charles E. Sheetz, Woodstock, Va., assignor to FMC Corporation, a corporation of Delaware
Filed Nov. 23, 1959, Ser. No. 854,741
14 Claims. (Cl. 198—209)

This invention pertains to fruit processing equipment and more particularly relates to apparatus for receiving fruit and arranging the same in a position wherein it is conveniently accessible to a person or persons who pack the fruit into boxes.

High speed fruit-grading machines divide an incoming stream of fruit into several grades according to the weight of the individual pieces of fruit. According to common practice, each weight group is discharged from the weight-grading machine onto a receiving platform individual to that group. Personnel stationed beside the platform hand pack the fruit, or alternatively the fruit can be discharged from the platform and packed automatically. With conventional equipment the fruit tends to concentrate in the location where it is received, causing injury to some of the fruit and causing personnel located at a distance from the receiving location to experience inconvenience and delay in picking up the fruit. The apparatus of the present invention eliminates this disadvantage by providing a rotary table to receive each grade of fruit and causes each piece of fruit in the incoming stream to be moved by centrifugal force to a position adjacent the outer edge of the table where it is conveniently accessible to a packer. As the fruit moves outward on the rotating table it is gradually accelerated until it attains the velocity of the fruit previously arranged at the table's periphery, thus replenishing the supply of fruit in the said conveniently accessible position in a manner which does not injure the fruit. On the other hand, with the present invention the fruit can be automatically discharged from the rotary table to other equipment for automatic packing or for other processing.

An object of the invention is to provide improved rotary fruit handling apparatus.

Another object of the invention is to provide improved fruit handling apparatus which continuously moves a supply of fruit in a position conveniently accessible to a packer or other fruit-handling personnel.

Another object of the invention is to provide circular fruit-handling apparatus which is adapted to gently move an incoming supply of fruit to the periphery thereof.

Another object of the invention is to provide rotary fruit-handling apparatus which is adapted to discharge the fruit thereon onto a conveyor.

Another object of the invention is to provide improved rotary fruit receiving apparatus adapted for use directly below fruit grading equipment.

Another object of the invention is to provide rotary fruit handling apparatus adapted for use with a side-delivery conveyor of a fruit grading machine.

Another object of the invention is to provide fruit handling apparatus which accelerates the incoming fruit to a velocity which is substantially the same as the velocity of fruit previously supplied to and moving with the apparatus, before the incoming fruit is allowed to mix with said moving fruit.

These and other objects and advantages of the invention will be apparent from the following description and the acompanying drawings, in which:

FIGURE 1 is a perspective of a fruit grading machine and illustrates two rotary fruit-handling tables of the present invention.

FIGURE 2 is a partly broken away top plan of one of the rotary fruit handling tables of FIG. 1.

FIGURE 3 is a partly broken away, enlarged section along lines 3—3 of FIG. 2.

FIGURE 4 is a side elevation illustrating the driving mechanism for one rotary fruit handling table.

FIGURE 5 is an enlarged section along lines 5—5 of FIG. 2 and illustrates mechanism for maintaining the alignment between inner and outer rotary components of the table when they are moved relatively to each other.

FIGURE 6 is a partly broken away top plan of a rotary fruit handling table according to a second embodiment of the invention.

FIGURE 7 is a partly broken away section along lines 7—7 of FIG. 6.

FIGURE 8 is a top plan of a rotary fruit-handling table according to a third embodiment of the invention.

FIGURE 9 is a side elevation of the table illustrated in FIG. 8.

FIGURE 10 is a top plan of a rotary fruit-handling table according to a fourth embodiment of the invention.

The rotary fruit-handling apparatus of the present invention is used in conjunction with equipment for grading apples or other kinds of fruit. The grading machine 20 (FIG. 1) includes a driven fruit-input conveyor 21, a fruit feed section 22 for placing the individual fruit into individual cups 24 of an endless cup conveyor 26, and a drive unit 28 for driving the cup conveyor. The cup conveyor 26 includes two parallel rows 25 and 25a, respectively (FIGS. 1 and 3), and is guided for movement through the machine 20 on a framework 30 and the fruit in the cups 24 are each individually weighed on a sensitive weighing device 32 (FIG. 1). Fruit in a preset heavy weight range are removed from the cup conveyor by operation of the weighing device 32. The remaining fruit F (FIG. 4) continues on the cup conveyor 26 to a second weighing device 34 (FIGS. 1 and 4), which is similar to the first and operates to remove fruit in a lighter preset weight range. Fruit too light to operate the second weighing device 34 is all discharged from the conveyor 26 into a suitable container placed on a shelf 36 in an end-sizer section 37 (FIG. 1) of the machine. Since the apparatus thus far described does not constitute part of the present invention, no further description thereof will be necessary herein.

Fruit which is sufficiently heavy to operate the weighing device 32 or the weighing device 34 is rolled out of its individual cup onto a respective rotary table 38 (FIG. 1) of the invention. One such rotary table 38 is located below each weighing device, but only one will be described herein in detail because they are identical in construction.

Fruit is moved onto the rotary table 38 from the weighing device 34 (FIGS. 1, 3 and 4) as a result of the cup 24 swinging downward about a shaft 39 (FIGS. 3 and 4) connected to its leading edge, allowing the fruit to roll out onto one side of an inverted V-shaped chute 40 (FIGS. 2 and 3). The chute 40 has a pair of vertical side walls 42 and 44 (FIG. 2) connected to it and a pair of volute wall members 46 and 48 are connected to the side walls 42 and 44, respectively. The chute and volute members comprise a baffle unit 50 which is centrally located below the cup conveyor 26 and is connected to the framework 30 of the machine by bolts 52 (FIG. 4) passing through appropriate brackets 54 (FIG. 2) on the baffle unit. The center high edge 56 of the chute 40 (FIG. 3) lies directly below and centrally between the two lines 25, 25a of cups 24 of the cup conveyor, causing fruit arriving from one side of the cup conveyor to roll down one side 40a of the chute 40 and causing fruit from the other side of the cup conveyor 26 to roll down the opposite side 40b of the chute. The sides of the chute 40 of the baffle unit 50 slope gradually downward to table level and the unit 50 therefore gently distributes fruit onto the rotary table 38.

The fruit handling table 38 includes a composite platform 58 (FIGS. 1–5) which is centrally mounted for rotation below and closely adjacent the baffle unit 50. The composite platform 58 comprises a central portion in the form of a rotating feed disc 60 and a coplanar outer portion in the form of a rotating annular member 62. The disc 60 and annular member 62 are concentric and are individually driven in the counterclockwise direction as viewed in FIG. 2 by the drive unit 28 (FIG. 1).

The feed disc 60 is journaled upon a short shaft 64 (FIG. 3) rigidly mounted upon the framework 30 of the machine. The disc 60 is usually rotated at a higher angular speed than the annular member 62 and three equally spaced sheaves 66 (FIGS. 2 and 5), each rotatably supported upon the disc, and a V-belt 70 connected to the annulus, are used to maintain the disc 60 and annulus 62 coplanar, and concentric with respect to shaft 64, during their rotation. A circular cutout 72 (FIGS. 2 and 5), is made at each of three equally spaced locations in the edge of the disc 60, and one of the sheaves 66 is arranged in each of the cutouts 72. Each sheave 66 (FIGS. 2, 4 and 5) is journaled on a pin 73 rigid with and projecting upward from a strap 74. The strap 74 is connected by bolts 76 to the disc 60 with the sheave 66 in the cutout 72 in planar alignment with the disc 60. The cutouts are sufficiently large to permit the sheaves to freely rotate on their bearings. The back of the V-belt 70 is glued or otherwise fastened to the inner peripheral edge 78 of the annular member 62. The V-belt 70 constitutes an inwardly projecting ridge which is engaged within the peripheral grooves of all three sheaves 66, thus maintaining the disc 60 and the annulus 62 coplanar and coaxial and permitting them to be driven at different angular speeds.

It will be apparent that the V-belt 70 could be mounted on the periphery of the disc 60 and the three sheaves 66 mounted in the annulus 62, if it is desired.

Individual resilient mats 80 and 82 (FIG. 5) of rubber or other material are placed on the upper surface of the disc 60 and the annulus 62, respectively, to minimize any tendency of the fruit to bruise. It will be noted that the mat 80 (FIG. 5) on the disc 60 is sufficiently stiff to span the cutouts 72, thus presenting an uninterruptedly flat surface to the fruit. Suitable stiffeners for the mat 80 can be used over the cutouts if it is necessary to preserve the flat characteristic of the surface.

The disc 60 and the annulus 62 of the rotary table 38 are driven by friction wheels 90 and 92 (FIG. 4), respectively. The wheels 90 and 92 are secured to a shaft 94 extending longitudinally in the framework 30 of the machine 20 and underlying both rotary tables 38. The drive shaft 94 is connected to be driven by the drive unit 28 (FIG. 1). The friction wheels are of the same diameter and are coated with rubber or other friction material to establish suitable driving engagement with the undersurface of the disc and the annulus.

The friction driving wheels 90 and 92 are adjustably located on the shaft 94 with respect to the center of rotation of the table 38 by sliding the wheels individually along the shaft 94 and tightening set screws 96, one of which is provided for each friction wheel. The respective speeds of rotation of the disc 60 and the annulus 62 are adjusted by relocating the friction drive wheels along the drive shaft 94. For apples it has been found that driving the feed disc 60 at three times the angular speed of the annulus 62 is satisfactory.

The two rotary components of the table 38 can be provided with additional support if the load it is to carry requires it. One or more freely rotatable rollers 98 (FIG. 4) can be suitably supported on the framework 30 and contact the undersurface of the annulus 62 to provide the additional support. If desired two rollers 99 and 100 rigidly interconnected by a tube 101 which is mounted for free rotation on the drive shaft 94 can be used under the disc 60 and the annulus 62, respectively. Suitable set collars 102 on the drive shaft 94 retain the tube 101 in such position on the drive shaft that the rollers 99 and 100 are the same radial distances as the drive wheels 90 and 92, respectively, from the common axis of rotation of the disc 60 and the annulus member 62.

The fruit from the cup conveyor 26 roll down the sloped sides of the chute 40 of the baffle unit 50, previously described, and roll off the ends of the chute onto the disc component 60 of the rotary table 38 (FIG. 2). The lower edges 104 and 106 of the sides 40a and 40b, respectively, of the chute can be curved, or straight as illustrated in FIG. 2 and these edges are positioned only far enough above the resilient rubber mat on the moving disc 60 to preclude frictional engagement therebetween. When a fruit contacts the moving disc surface it is angularly accelerated and moves tangentially off the feed disc 60 onto the moving annulus 62. The speeds of the rotary components of the table 38 should be adjusted so that the fruit coming onto the annulus 62 is moving at substantially the same angular speed as that of the inner periphery of the annulus. When adjusted in this manner the accelerated fruit will contact and mix with fruit moving at the same speed on the annulus and there will be little or no tendency for any of the fruit to be bruised, since no impact or collision between two pieces of fruit moving at different angular velocities occurs. Any tendency toward the occurrence of stem punctures, even among the most tender varieties of fruit, is likewise minimized.

Once the fruit arrives on the annulus 62 (FIG. 2) of the rotary table 38, it is prevented from rolling toward the center of the table by centrifugal force and additionally, by the two volute wall members 46 and 48 (FIGS. 2 and 3). The volute wall members have flared aprons 108 and 109, respectively, formed as a part of the lower portions thereof which gently urge the fruit to move toward the outer periphery of the annulus. The vertical side walls 42 and 44 terminate in walls 110 and 112, respectively. The outer surfaces of these vertical walls coincide as viewed from above (FIG. 2), with the gap or break 114 existing between the inner and outer rotary components of the table 38. This construction prevents any fruit moving on the annulus 62 from interfering with incoming fruit being angularly accelerated by the feed disc 60, and prevents fruit on the annulus 62 from rolling back onto the faster moving disc 60.

A circular wall 116 of any desired height surrounds the annulus 62 of the table 38 and prevents articles thereon from falling. The wall 116 is spaced out of contact with the outer edge of the annulus 62 and is connected by suitable brackets and bolts 117 (FIG. 2) to the framework 30.

The wall 116 surrounding the rotary table 38 is stationary and is provided with an opening 118. The wall opening 118 is provided with a hinged gate 119 which can be opened, permitting the fruit to move through the opening 118 by centrifugal force. A conveyor 120 (FIG. 2) connected to operate at the opening 118 can be used to convey fruit thus automatically discharged from the table 38 to boxes for bulk, or "loose" packing, or to other machinery for further processing.

A second embodiment of the rotary fruit handling apparatus of the invention is illustrated in FIGURES 6 and 7. This embodiment comprises a table 124 supported for rotation under the cup conveyor 26, and a short endless-belt conveyor 126 located below the cup conveyor 26 for moving the fruit laterally onto the table 124.

The table 124 (FIGS. 6 and 7) comprises an annulus 128 having a circular track 130 secured to the bottom side thereof. The circular track 130 includes a vertical wall member 132 (FIG. 7) and a horizontal flange 134. The freely rotatable rollers 136 (FIGS. 6 and 7) are rotatably supported on the framework 30 and engage the flange 134 of the circular track and support the annulus 128 for rotation in a horizontal plane.

The annulus 128 (FIG. 6) is driven in the counterclockwise direction as viewed in FIG. 6 by a pair of friction drive wheels 140 and 142 which are operably connected to the drive shaft 94, previously described. The drive wheel 140 is fastened to the drive shaft and engages the horizontal flange 134 of the circular track, to drive the annulus. The drive wheel 142 also engages the flange 134 of the circular track but wheel 142 is driven in the reverse direction from wheel 140 by the drive shaft 94, by means of a reversing mechanism 144 (FIGS. 6 and 7). The drive wheels 140 and 142 and the rollers 136 each engage the vertical wall 132 of the circular track and the annulus is thus prevented from shifting bodily in a horizontal plane during its rotation.

The reversing mechanism 144 (FIG. 7) includes a sprocket 146 connected to the drive shaft 94. The sprocket 146 is connected by a short chain 148 to an idler sprocket 150, journaled on a frame member 152. The sprocket 146 and the connected idler sprocket 150 are driven counterclockwise as viewed in FIG. 7 by the drive shaft 94. A short shaft 154 rotatably mounted on the frame member 152 carries a sprocket 156 which is driven in the opposite direction by the chain 148. The shaft 154 (FIG. 6) carries a sprocket 158 which through a short chain 160 drives a sprocket 162 in the same direction as the sprockets 156 and 158. The sprocket 162 and the friction drive wheel 142 are rigidly interconnected by a sleeve 164 (FIG. 6) and they are mounted for rotation on the drive shaft 94. The reversing mechanism 144 therefore drives the friction wheel 142 in an angular direction which is the reverse of the direction of rotation of the drive shaft 94.

The belt conveyor 126 (FIGS. 6 and 7) for moving the fruit onto the annulus 128 is mounted for movement on an idler drum 170 and a drive drum 172. The drums 170 and 172 are firmly mounted on shafts 174 and 176, respectively, and the shafts 174 and 176 are each mounted in suitable journals 178 secured to the framework of the machine. A short chain 180, interconnecting a sprocket 182 on the drive shaft 94 and a sprocket 184 rigid with the drive drum 172, drives the flat belt 186 of the conveyor 126 counterclockwise as viewed in FIG. 7.

Fruit leaving the cups 24 (FIG. 7) of the conveyor 26 rolls out onto a sloped wall 190 located adjacent the belt 186 or roll out directly onto the belt 186 of the conveyor 126. The fruit is prevented from rolling off the belt 186 by the wall 190 and a guide plate 191. The belt moves the fruit onto a sloped apron 192 which fits between the end of the conveyor 126 and the curved inner periphery of the annulus 128. The apron 192 is connected to the machine framework by any desired device. The fruit moves down the sloped apron 192 onto a space 194 on the surface of the annulus which is maintained clear of fruit from the annulus by a volute baffle member 196. The baffle member 196 includes a short wall portion 198 for guiding the fruit leaving the apron 192, and includes a long volute wall portion 200 connected to the wall portion 198. The baffle member 196 is suspended clear of the surface of the annulus by suitable brackets 201 connected to the machine framework. The long volute portion 200 gently moves the fruit on the annulus toward the outer edge of the annulus. The wall portion 200 includes an extension 202 which is cylindrical and is positioned adjacent the inner peripheral edge of the annulus 128 where it provides a wall for preventing fruit from falling off the inner edge of the annulus.

A circular wall 204 of any desired height surrounds the annulus of the rotary table 124 and prevents the fruit thereon from falling. The wall is spaced out of contact with the table and is connected by suitable brackets 206 to the machine framework.

A gate 208 (FIG. 6) is provided across an opening 209 in the stationary circular wall 204 by connecting a short segment 210 of the wall to the remaining wall by a hinge 212. The gate can be fastened shut by a latch 213, or swung open, allowing articles on the moving annulus to move through the opening 209 onto a suitable conveyor, such as the conveyor 120 (FIG. 2).

A third embodiment of the rotary fruit handling apparatus of the invention, illustrated in FIGURES 8 and 9, comprises a side-delivery flat-belt conveyor 220 (FIGS. 8 and 9) and a rotary table 222 similar to the rotary table 124 of the embodiment of FIGURES 6 and 7. The table 222 comprises an annulus 224 which is supported for rotation on a framework 226 (FIG. 9) which includes four legs 228 and two horizontal bracing members 230 which connect the legs 228 to the framework 30 of the grading machine 20.

A bevel gear 232 (FIG. 8) connected to the drive shaft 94 engages and drives a bevel gear 234 connected to a table driving shaft 236. The table driving shaft 236 is journaled in a bearing 238 near the bevel gear 234 thereon, and is journaled in a bearing 240 at the other end thereof. A table driving friction wheel 242 is fastened to the drive shaft 236 by a lock screw 243, and engages the undersurface of the annulus 224, and drives it in the counterclockwise direction as seen in FIG. 8. It will be apparent that the speed of the rotation of the annulus can be varied by adjusting the position of the friction wheel 242 along the table driving shaft 236. A plurality of freely rotatable double rollers 244, journaled on a bar 246 connected to the bracing members 230 of the framework, support the annulus 224 at points spaced from the friction driving wheel 242.

Each roller 244 includes a pair of wheels 244a and 244b which engage a circular track 248 fixed to the undersurface of the annulus 224. The track 248 has a T cross-section and has a central flange 250 which is positioned between the wheels 244a and 244b of each double roller 244 and prevents the annulus 224 from shifting in a horizontal plane during its rotation.

The endless conveyor 220 includes a belt 254 (FIG. 9) which is trained over an idler drum 256 and a belt driving drum 258 (FIG. 8). The idler drum 256 is mounted for rotation to two of the legs 228 of the framework 226 and the belt driving drum 258 is rotatably mounted on the machine framework 30. The belt 254 delivers the fruit from the cup conveyor 26 to the rotary table 222 (FIG. 8) and is driven by a chain 260 trained around two sprockets 262 and 264 which are fastened to the drive shaft 94 and the belt driving drum 258, respectively.

Guide walls 268 and 270, positioned along the sides of the upper run of the belt 254 prevent the fruit from falling. The guide walls are connected by suitable brackets 272 to the machine framework 30 and connected by brackets 274 to the upper portions of the legs 228.

A guide plate 276 (FIG. 9), connected to the lower edge of the guide walls 268 and 270, and positioned under the upper run of the belt 254, supports the receiving portion 254a thereof in a substantially horizontal plane. The plate 276 supports the discharge portion 254b of the upper run in an attitude sloping downward toward the idler drum 256. An inclined plate 277 lies at the end of the sloped portion 254b of the upper run and supports the fruit as it moves from the belt onto a cleared space 278 (FIG. 8) on the surface of the annulus 224.

Fruit moving with the annulus 224 is kept from rolling onto the cleared space 278 by a volute section 280 of a wall member 282. The wall member comprises the volute section 280 and a circular section 284 which is located adjacent the inner peripheral edge of the annulus 224 and prevents the fruit from falling. The volute section 280 and the circular section 284 of the wall member 282 are supported adjacent the moving annulus on brackets 286 connected to the legs 228 of the framework 226.

Fruit is prevented from falling off the outer peripheral edge of the annulus 224 by a stationary circular wall 290, which completely surrounds the annulus. The wall 290 is supported at one side of the rotary table 222 on two upright members 292 connected to the respective ends of the two bracing members 230 and is supported at the opposite side by two plates 294 rigid with the framework 30 of the machine.

Fruit moved in a circular path by the rotary table 222 circulates underneath the upper run of the conveyor belt 254. The guide plate 276 serves to space the upper run of the belt at a sufficient height above the table surface to permit the fruit on the table surface to move without interference from the belt.

A fourth embodiment of the rotary fruit handling apparatus of the invention comprises a rotary table 300 (FIG. 10) located beside the cup conveyor 26 of the fruit grading machine and includes a side delivery conveyor 302 which discharges fruit onto the table near the outer periphery of the latter.

The rotary table 300 includes an annulus 304 supported at two points by two idler rollers 306 which are journaled on a frame member 308. The annulus is driven counter-clockwise as viewed from above by a friction driving wheel 310 which engages the underside of the annulus, and is secured to an auxiliary drive shaft 312 that is driven by the drive shaft 94 through a bevel gear arrangement 314. A friction driving wheel 316 mounted for free rotation on the auxiliary drive shaft 312 is driven by a reversing mechanism 144, previously described. The wheel 316 also engages the underside of the annulus 304 and contributes to the driving of the annulus.

The frame member 308 is rigidly connected to two lateral frame bars 318 which are in turn rigid with four vertical legs 320 and with the framework 30 of the machine. The upper ends of the legs 320 project above the level of the annulus 304 and support a circular wall 322 located in the circular hole in the annulus. The circular wall 322 is stationary and is disposed just inside the inner peripheral edge of the annulus to prevent articles or fruit thereon from falling. The wall 322 also prevents the rotating annulus 304 from bodily shifting in a horizontal plane. Articles are prevented from falling off the outer peripheral edge of the annulus 304 by a stationary circular outer wall 324 which is mounted by suitable brackets 326 upon the machine framework.

The conveyor 302 includes a flat belt 330 which is trained over an idler drum 332 journaled on a projecting end of the frame member 308 and trained over a driving drum 334 rotatably mounted on the machine framework 30. A chain 336 interconnecting a sprocket 338 on the driving drum and a sprocket 340 on the drive shaft 94, drives the belt 330 for delivering the fruit from the conveyor 26 of the grading machine 20 to the rotary table 300.

The side delivery conveyor 302 deposits the fruit onto an apron 342 of cloth or other material located at the end of the belt 330 and extending arcuately through approximately 90° to the outer periphery of the annulus 304. The apron 342 constitutes a chute that guides the fruit as it is redirected from the conveyor 330 through an opening 343 in the circular outer wall 324 onto the surface of the annulus 304. Extending along the outer arcuate edge of the apron is a curved side wall 344 which is connected by bolts 346 to the circular wall 324. The side wall 344 aids in turning the fruit onto the annulus and prevents fruit from falling off the apron.

Each of the several disclosed embodiments of the rotary fruit handling apparatus quickly angularly accelerates the incoming fruit without damaging it, and continuously circulates the fruit in front of the fruit-handling personnel. This structure supplies an adequate amount of fruit to the personnel regardless of the rate at which they individually handle the fruit and regardless of the number of personnel working at a particular rotary table. The operation is fast yet gentle, preventing any damage to the fruit. The outer wall surrounding each of the rotary tables is stationary and this permits the wall to be opened for feeding sorted fruit onto a conveyor leading to an automatic packer or other fruit processing machinery.

While several forms of apparatus for carrying out the present invention have been described, it should be understood that various modifications can be made without departing from the spirit of the invention as defined by the appended claims.

The invention having thus been described, that which is believed to be new and is desired to be protected by Letters Patent is:

1. Rotary fruit handling apparatus comprising a disc, means including a framework supporting said disc for rotation, an annulus concentric with said disc, means defining a ridge on the inner periphery of said annulus, means carried by the disc and in engagement with said ridge to maintain the annulus coplanar with said disc, means for delivering fruit to said disc, means for rotating the disc and the annulus, and a wall member fastened to the framework for retaining the fruit on the rotating annulus.

2. Rotary fruit handling apparatus comprising a framework, a drive unit in said framework, a disc rotatably supported on said framework, an annular platform surrounding said disc, means for maintaining the annular platform coplanar with said disc, a baffle unit for guiding fruit onto the surface of said disc, a fruit confining wall surrounding said annular platform, and means connected to the drive unit for rotating the annular platform and the disc for tangentially moving the fruit received on the disc to the annular platform.

3. Rotary fruit handling apparatus comprising a framework, a drive unit in said framework, a disc rotatably supported on said framework, an annular platform surrounding said disc, means for maintaining the annular platform coplanar with said disc, a baffle unit for guiding fruit onto the surface of said disc, a fruit confining wall surrounding said annular platform, and means connected to the drive unit for rotating the annular platform at a predetermined angular speed and for rotating the disc at a higher predetermined angular speed for tangentially moving the fruit received on the disc to the annular platform.

4. Rotary fruit handling apparatus comprising a framework, a drive unit carried by said framework, a disc rotatably supported on said framework, an annular platform surrounding said disc, means defining a ridge connected to the inner peripheral edge of said annular platform, a plurality of sheaves rotatably mounted on said disc and engaged with said ridge for maintaining the annular platform coplanar with the disc, means for guiding fruit onto the surface of the disc, and means connected to the drive unit for rotating the annular platform at a first speed and for rotating the disc at a second speed faster than said first speed to tangentially move the fruit received on the disc to the annular platform.

5. Rotary fruit handling apparatus comprising a framework, a drive unit carried by said framework, a disc rotatably supported on said framework, an annular platform surrounding said disc, means defining a ridge connected to the inner peripheral edge of said annular platform, a plurality of sheaves rotatably mounted on said disc and engaged with said ridge for maintaining the annular platform coplanar with the disc, means for guiding fruit onto the surface of the disc, means connected to the drive unit for rotating the annular platform at a first speed and for rotating the disc at a second speed faster than said first speed to tangentially move the fruit received on the disc to the annular platform, and a stationary circular wall connected to said framework and located adjacent the outer peripheral edge of the annular platform for retaining fruit on the platform.

6. Rotary fruit handling apparatus comprising a frame, a composite rotatable platform on said frame, said platform comprising a disc portion rotatably mounted on said frame and a coplanar annular portion concentric with said disc portion and rotatably mounted on said frame, said platform portions having closely spaced annular edges, fruit delivery means on said frame and extending generally diametrically of said disc portion for depositing fruit on the disc portion, a wall on said frame and facing the delivery end of said fruit delivery means for initially retaining fruit delivered by said fruit delivery means on said disc portion, a fruit confining wall surrounding said platform, and means for rotating said disc and annular platform portions.

7. Rotary fruit handling apparatus comprising a frame, a composite rotatable platform on said frame, said platform comprising a disc portion rotatably mounted on said frame and a coplanar annular portion concentric with said disc portion and rotatably mounted on said frame, said platform portions having closely spaced annular edges, fruit delivery means on said frame and extending generally diametrically of said disc portion for depositing fruit on the disc portion, a wall on said frame and facing the delivery end of said fruit delivery means for initially retaining fruit delivered by said fruit delivery means on said disc portion, a fruit confining wall on said frame surrounding said annular platform portion, a fruit delivery opening in said fruit confining wall, and means for rotating said disc and annular platform portions.

8. Fruit handling apparatus comprising a frame, a composite rotatable platform comprising an inner disc portion rotatably mounted on said frame and an outer annular portion rotatably mounted on said frame and concentric with said disc portion, said annular platform portion forming a continuation of said disc portion, fruit delivery means on said frame extending generally diametrically of said disc portion and terminating above said disc portion, means for rotating said disc portion at one angular velocity and said annular portion at a lower angular velocity, and a fruit confining wall at the periphery of said annular portion.

9. Apparatus for distributing fruit comprising a frame, an annular fruit distributing platform rotatably mounted on said frame, fruit delivery means on said frame extending in a generally diametrical direction relative to said platform, a wall on said frame that overlies the inner peripheral portion of said platform and faces the delivery end of said fruit delivery means, means for transferring fruit from said fruit delivery means to the inner periphery of said annular platform, a fruit confining wall surrounding said annular platform, and means for rotating said annular platform.

10. Rotary fruit handling apparatus comprising a frame, a composite rotatable fruit supporting and distributing platform, said platform comprising a disc portion rotatably mounted on said frame and an annular portion concentric with said disc portion and rotatably mounted on said frame, said platform portions having closely spaced annular edges, the upper surfaces of said platform portions being coplanar, means for maintaining the planar alignment of said platform portions comprising an annular track mounted on said edge of one of said platform portions, and a plurality of sheaves mounted adjacent said edge of the other of said platform portions and engaging said track, means for guiding fruit onto the surface of said disc portion, a fruit confining wall surrounding said annular platform portion, and means for rotating said platform portions.

11. Apparatus for distributing fruit comprising a frame, an annular fruit distributing platform rotatably mounted on said frame, fruit delivery means on said frame that extends in a generally diametrical direction relative to said platform, a wall on said frame that faces the delivery end of said fruit delivery means, means for transferring fruit from said fruit delivery means to the inner periphery of said annular platform, a fruit confining wall surrounding said annular platform, said wall being mounted on said frame and having a fruit delivery opening formed therein, and means for rotating said platform.

12. The fruit distributing apparatus of claim 11 wherein said fruit delivery means comprises a belt conveyor.

13. Rotary fruit handling apparatus comprising a frame, a composite rotatable platform on said frame, said platform comprising a disc portion rotatably mounted on said frame and a coplanar annular portion concentric with said disc portion and rotatably mounted on said frame, said platform portions having closely spaced annular edges, fruit delivery means on said frame and extending generally diametrically of said disc portion for depositing fruit on the disc portion, a wall on said frame and facing the delivery end of said fruit delivery means for initially retaining fruit delivered by said fruit delivery means on said disc portion, a fruit confining wall surrounding said platform, and means for rotating said disc portion at one speed and said annular platform portion at a slower speed.

14. Fruit handling apparatus comprising a frame, a composite fruit distributing platform rotatably mounted on said frame, said platform comprising an inner disc portion and an outer annular portion concentric with said disc portion, said annular platform portion forming a continuation of said inner disc portion, fruit delivery means on said frame extending generally diametrically of said disc portion and terminating above said disc portion for delivering fruit generally radially to said disc portion, a wall mounted on the frame that extends generally radially from said fruit delivery means and then progressively changes its direction and faces the delivery end of said fruit delivery means, said wall overlying said disc portion and receiving radially moving fruit from said fruit delivery means and directing the fruit generally tangentially to the inner periphery of said annular platform portion, means for rotating said disc portion at one angular velocity and said annular portion at a lower angular velocity, and a fruit confining wall at the periphery of said annular portion.

References Cited in the file of this patent

UNITED STATES PATENTS

| 1,762,129 | Colbert | June 3, 1930 |
| 1,875,863 | Fetterman | Sept. 6, 1932 |
| 1,961,478 | De Back | June 5, 1934 |
| 2,032,619 | Bounty | Mar. 3, 1936 |
| 2,622,747 | Bott | Dec. 23, 1952 |